United States Patent [19]

Wacker et al.

[11] 3,747,619

[45] July 24, 1973

[54] SEAL-OFF VALVE

[76] Inventors: George A. Wacker, 12507 Windover Turn, Bowie, Md. 20715; George J. Danek, Jr., 1021 Harbor Dr., R.F.D. 3, Annapolis, Md. 21403

[22] Filed: Dec. 23, 1971

[21] Appl. No.: 211,234

[52] U.S. Cl. ............................... 137/80, 251/68
[51] Int. Cl. ............................... F16k 17/38
[58] Field of Search ......................... 251/66-69; 137/67, 72-77, 79-80, 65

[56] References Cited
UNITED STATES PATENTS

| 325,989 | 9/1885 | Stearns | 137/75 |
| 1,620,876 | 3/1927 | Currivan | 137/76 |
| 1,849,491 | 3/1932 | Kelley | 251/66 X |
| 2,181,523 | 11/1939 | Shiels | 137/76 |
| 2,638,106 | 5/1953 | Shiels | 137/75 |
| 3,558,369 | 1/1971 | Wang et al | 148/11.5 |

*Primary Examiner*—Martin P. Schwadron
*Assistant Examiner*—Richard Gerard
*Attorney*—R. S. Sciascia and Q. E. Hodges

[57] ABSTRACT

A seal-off valve has a valve body with first and second portions. The first portion forms a passageway to permit the flow of fluid therethrough and the second portion integratedly forms a cavity with the passageway. A flow obstructing means is retained in a first position substantially within the cavity by temperature reponsive retention means which, upon actuation in response to a substantial temperature change, permits the flow obstructing means to be urged to a second position substantially within the passageway.

9 Claims, 4 Drawing Figures

INVENTORS
GEORGE A. WACKER
GEORGE J. DANEK
BY
OE Hodges
ATTORNEY

Patented July 24, 1973 3,747,619

INVENTORS
GEORGE A. WACKER
GEORGE J. DANEK
BY

ATTORNEY

SEAL-OFF VALVE

The invention described herein may be manufactured and used by or for the Government of the United States of America for governmental purposes without the payment of any royalties thereon or therefor.

BACKGROUND OF THE INVENTION

This invention relates generally to valves and valve actuation and specifically to valves operated by joining flow path sections so that the valve motion is transverse to the linear component.

In many processing operations it becomes vital that pipelines carrying polluting, toxic or hazardous fluids be provided with shut off valves capable of being automatically or remotely actuated to stop fluid flow when there is a potentially dangerous condition in the pipeline such as a fire, rupture, or other such natural or accidental catastrophes. The need for such valves has become readily apparent during major oil spills and fires which have occurred at the sites of offshore oil wells. Presently, no known way exists to satisfactorily stop fluid flow through pipelines which are susceptible to such potentially dangerous conditions.

SUMMARY OF THE INVENTION

Accordingly, the present invention provides a valve which is capable of being either automatically or remotely actuated to stop the flow of fluid through a pipeline. The foregoing is accomplished by providing a valve with a valve body having a first portion forming a passageway to permit the flow of fluid therethrough and a second portion integratedly forming a cavity with the passageway.

A flow obstructing means is retained in a first position substantially within the cavity by temperature responsive retention means which may be actuated in response to a substantial temperature change such as might occur in the case of a fire. Also, the retention means may be remotely actuated by heat induced through the use of an electric current passing through a wire located adjacent the retention means. Actuation of the retention means permits the flow obstructing means to be urged by a resilient means to a second position substantially within the passageway. Thus, such a valve or a series of such valves, located along a pipeline provides a satisfactory means for stopping fluid flow through a pipeline in instances where human access to the valves is either impractical or impossible.

OBJECTS OF THE INVNETION

It is therefore an object of this invention to provide a valve which may be self-actuating to stop fluid flow therethrough.

It is a further object of this invention to provide such a valve which may be remotely actuated at a given time.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
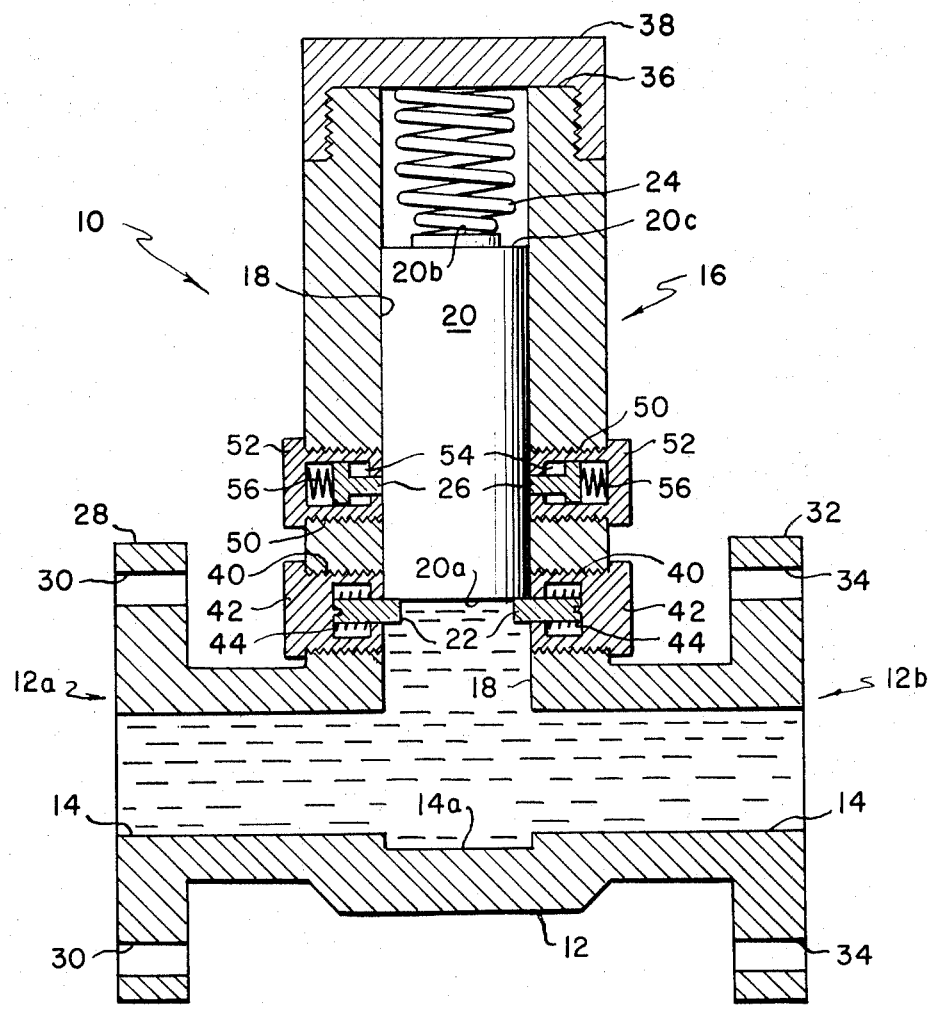
FIG. 1 is a cross-sectional side elevation of the valve of this invention illustrating the flow obstructing means retained in the first position within the cavity.

Referring now to FIG. 1, it can be seen that the valve of this invention comprises a valve body generally designated 10 including a first portion 12 forming a passageway 14 to permit the flow of fluid therethrough and a second portion 16 integrately forming a cavity 18 with passageway 14. Flow obstructing means or plunger 20 is in a first position substantially within cavity 18 and is provided to move from the first position as shown in FIG. 1 to a second position substantially within passageway 14 to obstruct the flow of fluid therethrough as shown in FIG. 2.

Again in FIG. 1, it is shown that temperature responsive retention means or pins 22, provided within second portion 16, retain flow obstructing means 20 in the first position. Pins 22 are provided to be actuated in response to a substantial temperature change to permit flow obstructing means 20 to move to the second position as shown in FIG. 2.

Figure 2:
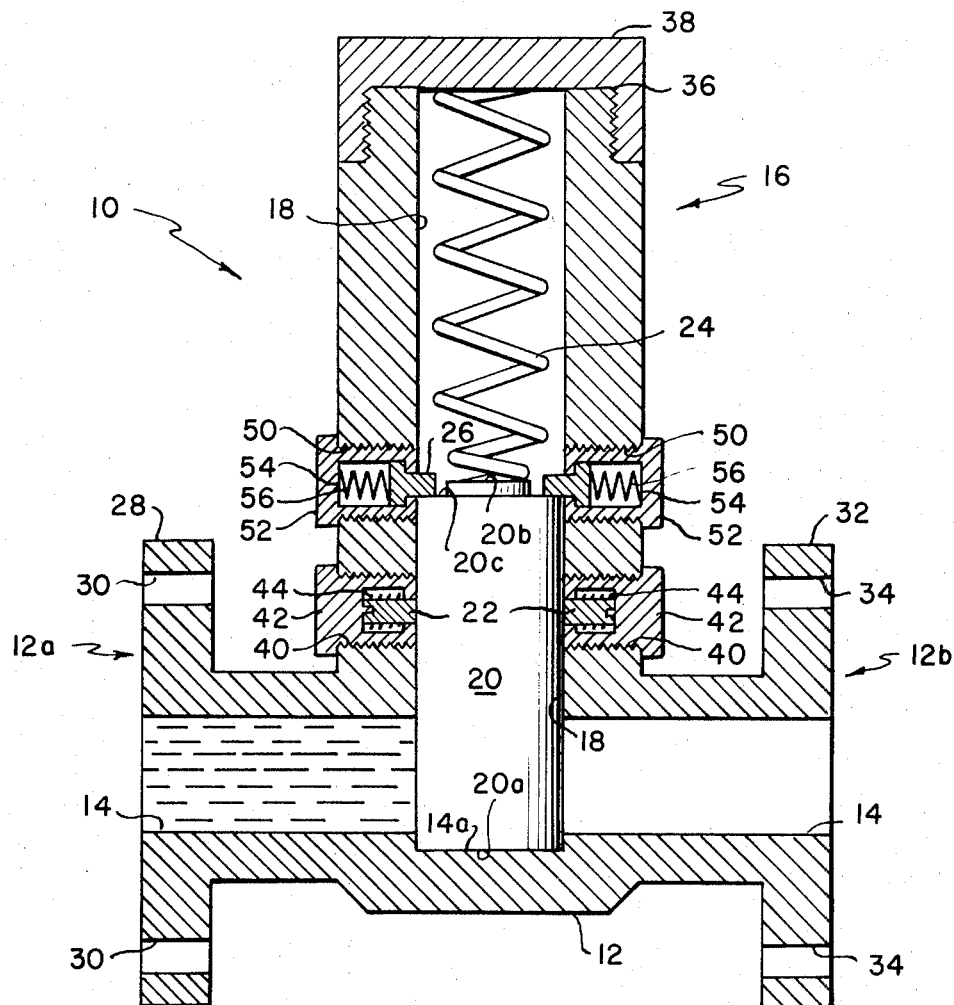
FIG. 2 is a cross-sectional side elevation of the valve of FIG. 1 illustrating the flow obstructing means lowered to the second position with the passageway.

Resilient means such as coil spring 24 is provided within cavity 18 to urge flow obstructing means 20 from the first position to the second position when pins 22 are actuated, see FIGS. 1 and 2.

Figure 3:
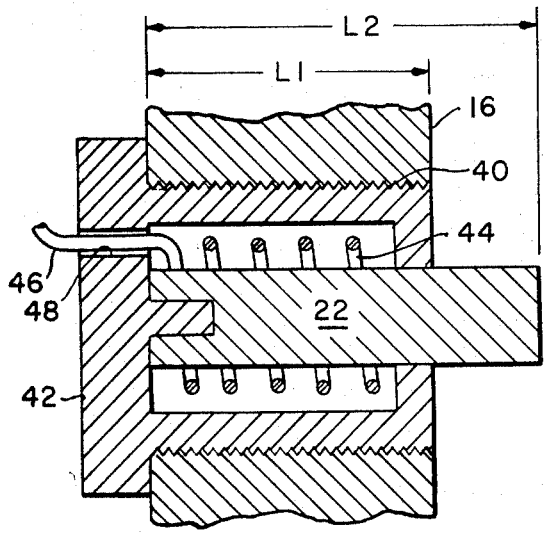
FIG. 3 is an enlarged cross-sectional side elevation illustrating the first configuration of the retention means.
Figure 4:
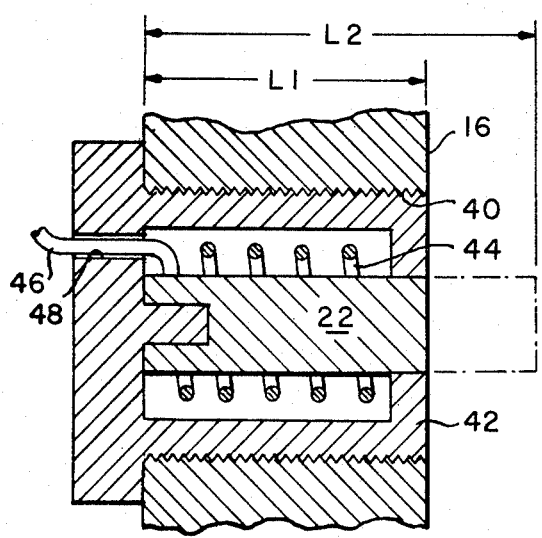
FIG. 4 is an enlarged cross-sectional side elevation illustrating the second configuration of the retention means of FIG. 3.

Pins 22 comprise at least one metal alloy member, preferably two, having a first configuration (FIG. 3) at a first relatively low temperature for retaining plunger 20 in the first position and also has a second configuration (FIG. 4) at a second relatively higher temperature than the first temperature for permitting plunger 20 to move to the second position. As shown in FIGS. 3 and 4, the first configuration of pins 22 comprises a relatively greater volume than the second configuration thereof. Pins or metal alloy members 22 preferably comprise the variable transition temperature alloy known as 55 NITINOL.

Coil spring 24 is provided to be maintained under compression within cavity 18 when plunger 20 is in either of the first or second positions.

Lock means 26 are spring-loaded within cavity 18 and thus are provided to maintain plunger 20 in the second position, see FIGS. 1 and 2.

Metal alloy member or pin 22 is secured within second portion 16 and extended into cavity 18 when pin 22 is in the first configuration. In this position, pin 22 is in supporting contact with flow obstructing means or plunger 20 when the plunger is in the first position, see FIG. 1. Upon actuation, pin 22 retracts out of supporting contact with plunger 20 into the second configuration to permit plunger 20 to move to the second position as shown in FIG. 2.

Valve 10 further includes means to be remotely actuated for actuating the metal alloy member 22, which means comprises an electrical resistance heating coil 44 adjacent metal alloy member 22. Coil 44 is responsive to electrical current pluses to cause a substantial temperature change in alloy member 22 thereby actuating the metal alloy member, see FIGS. 3 and 4.

Valve body 10, FIG. 1, is preferably cast from any suitable metal alloy to integratedly form first portion 12 and second portion 16. First portion 12 forms cylindrical passageway 14 and second portion 16 integratedly forms cylindrical cavity 18 with passageway 14. One end 12a of first portion 12 is provided with a flange 28 having holes 30. In this manner, a mating flange of an adjacent pipeline member (not shown) having holes which may be aligned with holes 30, may be secured by bolts to one end 12a of first portion 12. Similarly, another end 12b, opposite the one end 12a of first portion 12, may be provided with a flange 32 having holes 34 to be secured to a mating flange of its respective adjacent pipeline member. Thus, first portion 12 of valve body 10 is incorporated within a pipeline system so that fluid flowing through the piepline passes unobstructed through passageway 14.

Second portion 16 of valve body 10 is provided to form cavity 18 integratedly with passageway 14 as is clearly shown in FIG. 1. Opposite the intersection of cavity 18 and passageway 14, second portion 16 terminates in a threaded end 36 which is preferrably capped with a mating threaded removable cap 38.

Threaded holes 40 of second portion 16 are provided to receive threaded retention plugs 42 in which pins 22 are mounted to extend into cavity 18. In this manner, plunger 20 is retained within cavity 18 in the first position.

Between plunger 20 and cap 38, high tension spring 24 is compressed within cavity 18. Thus plunger 20 is in a preloaded condition in the first position while being retained therein by pins 22. Spring 24 must be able to retain its resilient capacity at high temperatures, therefore steel alloys such as those commonly known as A286 or S816 are preferred.

FIGS. 3 and 4 illustrate retention plugs 42 preferrably formed of 90-10 copper nickel alloy because of its high thermal conductivity. Thus in the case of a fire, heat will readily be conducted through plugs 42 to pins 22. Electrical resistance heating coils 44 are located within plugs 42 adjacent NITINOL pins 22 so that the pins can be remotely actuated, due to electrical current pulses acting through coil 44 to cause a temperature change in pins 22. Wire 46 connects coil 44 to an external electrical source (not shown) through opening 48 in plug 42. Also, pins 22 will be actuated due to a temperature change caused by a fire or the like. Heat is readily conducted through plugs 42 to pins 22. As previously stated, pins 22 comprise the variable transition temperature alloy known as 55 NITINOL which is described in U.S. Pat. No. 3,558,369 to F. E. Wang et al. NITINOL alloy is worked and heat treated to effect a reversion back to an original configuration as the result of the martinsitic transition of the alloy due to heat treatment.

FIG. 3 illustrates the pins 22 which are cut to length L1 and then deformed in tension at room temperature (martinsitic state of the alloy) to length L2. Pins 22 are then installed in plugs 42 at length L2 which represents the first configuration of the pins. Pins 22 will maintain the first configuration at a first relatively low temperature which may be included in a rather wide temperature range such as any naturally occuring environmental temperature. However, when pins 22 are exposed to a second temperature or to the desired transition temperature, i.e. a relatively higher temperature than the first temperature, they will contract to a second configuration or their original length L1, see FIGS. 3 and 4. The second temperature may be substantially at 300°F however, by suitable choice of the NITINOL 55 composition, the alloy may be provided with a memory transition temperature of whatever practical level is desired. Thus, the first configuration of pins 22 at a first temperature comprises a relatively greater volume than the second configuration at the second temperature.

Plunger 20 is correspondingly formed to fit within cavity 18 and is preferrably formed from a suitable steel alloy. Lower end 20a of plunger 20, as viewed in FIGS. 1 and 2, rests against pins 22, thus plunger 20 is retained in the first position. Upon realizing a sufficient temperature change, pins 22 contract and spring 24 urges plunger 20 downward substantially into passageway 14. It is preferred that end 20a extends into recess 14a of passageway 14 to assure a more stable obstruction to the flow of fluid through the passageway. When end 20a of plunger 20 is urged into recess 14a, spring 24 is still compressed under a preload thus exerting a downward force on plunger 20. End 20b of plunger 20, opposite end 20a, has a circular lip portion 20c machined therein thus forming a recess for permitting spring loaded lock means 26 to extend into position for locking plunger 20 in the second position.

Threaded holes 50 are provided in second portion 16 for mating threaded lock plugs 52. Each lock plug 52 includes cavity 54 which contains lock means or lock pins 26 and spring 56. When plunger 20 is in the first position, FIG. 1, plugs 52 may be placed into holes 50. Lock pin 26 is urged against plunger 20 by spring 56 and exerts a constant force thereon. When plunger 20 moves to the second position, FIG. 2, lock pins 26 penetrate the cavity 18 and extend into lip portion 20c thus locking plunger 20 in the second position. The high tensile spring 56 which is compressed against lock pin 26 is preferably formed of the A286 or S816 alloy as previously mentioned for spring 24.

In operation, plunger 20 is retained in the first position by retention means 22, FIG. 1, thus permitting the free flow of fluid through passageway 14. Lock pins 26 are preloaded against plunger 20 and spring 24 is preloaded to exert a force against end 20b of plunger 20. When a sufficient temperature change occurs and is conducted to pins 22, or when electrical impulses are supplied to coils 44 by remote source, pins 22 contract from their larger volume, first configuration to their relatively smaller volume, second configuration. The change in volume is sufficient to reduce pins 22 from L2 to L1 thus permitting plunger 20 to be urged downward substantially into cavity 14 by spring 24 until end 20a of plunger 20 extends into recess 14a of cavity 14, see FIG. 2. In this second position, lock pins 26 are permitted to extend into the recess formed by lip portion 20c thus locking plunger 20 in the second position thereby obstructing fluid flow through passageway 14. Valve 10 may be rendered operational for re-use by removing lock plugs 52. Cap 38 may then be removed to permit spring 24 and plunger 20 to be withdrawn from cavity 18. Retention plugs 42 may be removed and new pins 22 may replace the used or contracted pins. Retention plugs 42 may then be replaced in holes 40 and plunger 20 may be lowered into cavity 18 until end 20a rests on new pins 22. Spring 24 may again be compressed between end 20b of plunger 20 and cap 38 which may be secured tightly on threaded end 36 of second portion 16. Lock plugs 52 may be replaced in threaded holes 50 whereby lock pins 26 are compressed against plunger 20. Thus, replacement of parts in order to render valve 10 operational is limited to replacement of contracted pins 22 with new pins 22 in the form of the relatively large volume, first configuration.

Obviously many modifications and variations of the present invention are possible in the light of the above teachings. It is therefore to be understood that within the scope of the appended claims, the invention may be practiced otherwise than as specifically described.

What is claimed is:

1. A valve comprising:
   a valve body having a first portion forming a passageway to permit the flow of fluid therethrough and a second portion integratedly forming a cavity with said passageway;
   flow obstructing means within said cavity provided to move from a first position substantially within said cavity to a second position substantially within said passageway to obstruct the flow of fluid therethrough;
   variable volume retention means within said second portion provided to retain said flow obstructing means in said first position and provided to be actuated in response to a substantial temperature change to permit said flow obstructing means to move to said second position, said retention means comprises a material which decreases in volume upon temperature rise; and
   resilient means provided to urge said flow obstructing means from said first to said second position when said retention means is actuated.

2. The valve of claim 1 wherein said retention means comprises:
   at least one metal alloy member having a first configuration at a first temperature for retaining said flow obstructing means in said first position and having a second configuration at a second temperature relatively higher than said first temperature for permitting said flow obstructing means to move to said second position.

3. A valve comprising:
   a valve body having a first portion forming a passageway to permit the flow of fluid therethrough and a second portion integratedly forming a cavity with said passageway;
   flow obstructing means within said cavity provided to move from a first position substantially within said passageway to obstruct the flow of fluid therethrough;
   temperature responsive retention means within said second portion provided to retain said flow obstructing means in said first position and provided to be actuated in response to a substantial temperature change to permit said flow obstructing means to move to said second position;
   said retention means comprising at least one metal alloy member having a first configuration at a first temperature for retaining said flow obstructing means in said first position and having a second configuration at a second temperature relatively higher than said first temperature for permitting said flow obstructing means to move to said second position,
   said first configuration comprises a relatively greater volume than said second configuration; and
   resilient means provided to urge said flow obstructing means from said first to said second position when said retention means is actuated.

4. The valve of claim 3 wherein:
   said metal alloy member is secured within said second portion and extended into said cavity in said first configuration in supporting contact with said flow obstructing means when said flow obstructing means is in said first position, and upon actuation, said metal alloy member retracts out of supporting contact with said flow obstructing means into said second configuration to permit said flow obstructing means to move to said second position.

5. The valve of claim 4 wherein:
   said metal alloy member comprises 55 NITINOL.

6. The valve of claim 1 wherein:
   said resilient means comprises a coil spring maintained under compression within said cavity when said flow obstructing means is in either said first or said second position.

7. The valve of claim 6 and further comprising:
   lock means provided to maintain said flow obstructing means in said second position.

8. The valve of claim 4, and further including:
   means to be remotely actuated for actuating said metal alloy member.

9. The valve of claim 8 wherein said means to be remotely actuated comprises:
   an electrical resistance heating coil adjacent said metal alloy member which coil is responsive to electrical current pulses to cause a substantial temperature change in said metal alloy member;
   whereby said metal alloy member is actuated.

* * * * *